Jan. 20, 1925.
J. J. SULLIVAN
ANTISKID DEVICE
Filed June 19, 1923
1,523,499
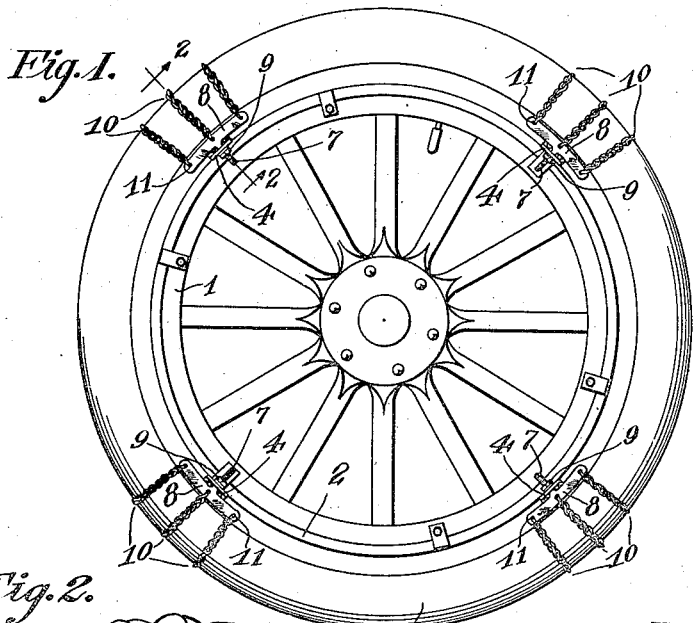
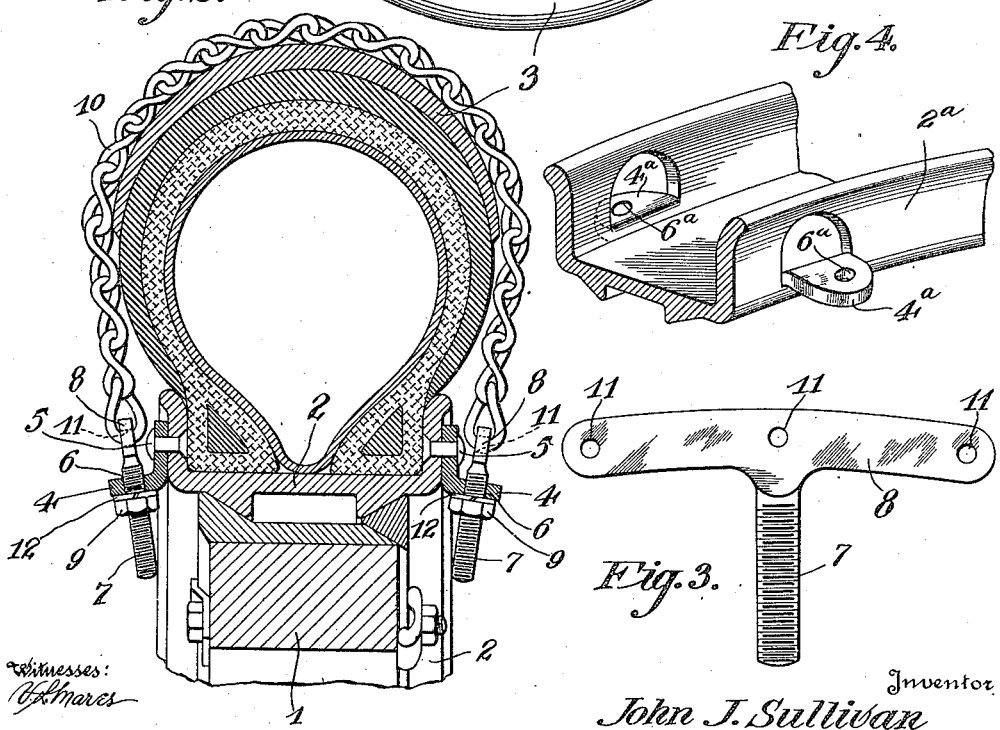
Inventor
John J. Sullivan
By Joshua R. H. Potts
his Attorney Patented Jan. 20, 1925.

1,523,499

UNITED STATES PATENT OFFICE.

JOHN J. SULLIVAN, OF POTTSVILLE, PENNSYLVANIA.

ANTISKID DEVICE.

Application filed June 19, 1923. Serial No. 646,320.

*To all whom it may concern:*

Be it known that I, JOHN J. SULLIVAN, a citizen of the United States, residing at Pottsville, in the county of Schuylkill and State of Pennsylvania, have invented certain new and useful Improvements in Antiskid Devices, of which the following is a specification.

My invention relates to anti-skid devices and is particularly adapted for use on automobile wheels. The objects are to provide anti-skid means which may be applied to a wheel without jacking it up or moving the automobile so that the wheels will move onto the anti-skid means; and anti-skid means which may be fitted tightly around the tire of a wheel, thus preventing loose chains from dangling from the wheel and striking the fenders and which are simple, durable and easily manufactured.

These objects, and other advantageous ends which will be described hereinafter, I attain in the following manner, reference being had to the accompanying drawing in which Figure 1 is a side view of an automobile wheel having my invention applied thereto, Figure 2 is an enlarged fragmentary section on line 2—2 of Figure 1, Figure 3 is a side view of a chain holder which forms a part of my invention, and Figure 4 is a perspective view of a modified form of rim which may be used with my invention.

Referring to the drawing, 1 indicates the felloe of a wheel, 2 the rim secured to the felloe in any well known manner and 3 the tire mounted on the rim.

My invention includes lugs 4 secured to the opposite sides of the rim by rivets 5, or otherwise. The lugs have holes 6 through which pass threaded stems 7 integral with chain holders 8. Nuts 9 on the threaded stems secure the chain holders to the lugs. The chain holders 8 are preferably flat and arcuate in shape as shown in Figures 2 and 3 and may be of any suitable length.

In the form shown the chain holders are of a length suitable for three chains 10 spaced apart and secured to the chain holders through the holes 11. If the chain holders are comparatively long and are provided with a great number of chains, more stems may be provided on the chain holders to properly secure them to the lugs.

In Figure 4 I have shown the lugs 4ª, with holes 6ª therein, struck out from the sides of the rim 2ª. In all other respects the rim is similar in construction to the rim shown in Figures 1 and 2.

To apply my improved anti-skid device to an automobile wheel the stems on the chain holders are passed through the holes in the lugs at opposite sides of the wheel so that the chains will embrace the tire. The nuts are screwed on the stems until they engage the lugs and tightened slightly so the chains embracing the tire are not loose or liable to dangle. The nut is locked in this position by any suitable means such as the lock washer 12.

My anti-skid device is of special advantage when the automobile is stuck in mud or snow as it may be applied without jacking up the wheel or moving the automobile so the wheel will run onto the device which was the common practice. The threaded stem on the chain holders makes it possible to tighten the chains, which embrace the tire, to any desired degree.

When the first chain engages the ground and is strained it tends to cant one end of the chain holders. The last chain, which is not engaging the ground and is connected to the other end of the chain holders, tends to prevent the first end from canting. In other words, the first chain is prevented from slipping by the last chain and the last chain by the first chain.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. An anti-skid device for a wheel including a pair of chain holders; spaced chains connecting the chain holders; a stem extending from each chain holder and disposed substantially midway between the most remote chains, and means for adjustably securing the stem to the wheel.

2. An anti-skid device for a wheel including a pair of chain holders; spaced chains connecting the chain holders; a threaded stem extending from each chain holder and disposed substantially midway between the most remote chains; lugs carried by the wheel, each lug having a hole therein for receiving the stems, and means for adjustably securing the stems to the lugs.

3. An anti-skid device for a wheel including a pair of arcuate chain holders; spaced chains connecting the chain holders; a threaded stem extending from each chain holder and disposed substantially midway between the most remote chains; lugs carried by the wheel, each lug having a hole therein for receiving the stems, and means for adjustably securing the stems to the lugs.

4. In combination with a wheel rim; lugs carried by the opposite sides of the rim, each lug having a hole therein; a pair of chain holders; chains connected to the chain holders; a stem on each chain holder adapted to pass through the holes in the lugs, and means for adjustably securing the stems to the lugs.

In testimony whereof I have signed my name to this specification in the presence of two subscribing witnesses.

JOHN J. SULLIVAN.

Witnesses:
EVELYN CROMPTON,
ELIZABETH GARBE.